US009800760B1

(12) United States Patent
Nakahara

(10) Patent No.: US 9,800,760 B1
(45) Date of Patent: Oct. 24, 2017

(54) FAST DRAWING OF UNROTATED DELTA ROW ENCODED IMAGES

(71) Applicant: Kyocera Document Solutions Inc., Osaka (JP)

(72) Inventor: Hideo Nakahara, Torrance, CA (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 15/281,107

(22) Filed: Sep. 30, 2016

(51) Int. Cl.
  G06F 15/00 (2006.01)
  G06F 1/00 (2006.01)
  G06K 1/00 (2006.01)
  G06K 15/00 (2006.01)
  H04N 1/41 (2006.01)
  G06K 15/02 (2006.01)
  H04N 1/64 (2006.01)

(52) U.S. Cl.
  CPC ........... *H04N 1/41* (2013.01); *G06K 15/1822* (2013.01); *G06K 15/1843* (2013.01); *H04N 1/642* (2013.01); *H04N 2201/0094* (2013.01)

(58) Field of Classification Search
  CPC .. H04N 1/41; H04N 1/642; H04N 2201/0094; G06K 15/1822; G06K 15/1843
  USPC ................ 358/1.16, 1.9, 1.1, 426.02, 426.07
  See application file for complete search history.

(56) References Cited

U.S. PATENT DOCUMENTS

| 8,351,719 | B2 | 1/2013 | Horikoshi | |
| 2005/0025240 | A1* | 2/2005 | Kuo | H04N 19/61 375/240.12 |
| 2005/0152610 | A1* | 7/2005 | Hagiwara | H04N 1/4105 382/239 |
| 2012/0257837 | A1* | 10/2012 | Fujita | H04N 19/44 382/233 |
| 2015/0003524 | A1* | 1/2015 | Yamamoto | H04N 19/587 375/240.12 |

FOREIGN PATENT DOCUMENTS

JP  2002-152048 A  5/2002

* cited by examiner

*Primary Examiner* — Douglas Tran
(74) *Attorney, Agent, or Firm* — James Judge

(57) ABSTRACT

A method includes: receiving, at a computing device, image data encoded by delta row encoding, the image data indicating two dimensionally arranged plurality of pixels, the image data including delta data indicating difference between N-th row line and (N−1)th row line in the two dimensionally arranged plurality of pixels; pre-decoding the image data for the N-th row line using the delta data if the delta data has a size equal to or larger than a threshold while keeping the image data for the N-th row line using the delta data if the delta data has a size smaller than the threshold so as to generate intermediate codes using the computing device; and decoding and rendering the kept undecoded lines in the generated intermediate codes while rendering the decoded lines in the generated intermediate codes using the computing device.

18 Claims, 18 Drawing Sheets

Comparative Example

Embodiment

FAST DRAWING OF UNROTATED DELTA ROW ENCODED IMAGES

BACKGROUND

Unless otherwise indicated herein, the description in this section is not prior art to the claims in this application and is not admitted to be prior art by inclusion in this section.

This disclosure is related with an image-forming apparatus having a printing function such as printers, copiers, facsimile machines, and multi-function peripheral (MFP) having the functions of these apparatus. The image-forming apparatus processes images with high resolutions, which consume a large memory area. The memory area is saved by converting a print job of each page into intermediate codes after being divided into a plurality of bands. The intermediate codes are stored in the memory area while the image printing is performed on a page-by-page basis by rasterizing the stored intermediate codes into a bit image.

SUMMARY

A method according to one aspect of the disclosure includes: receiving, at a computing device, image data encoded by delta row encoding, the image data indicating two dimensionally arranged plurality of pixels, the image data including delta data indicating difference between N-th row line and (N−1)th row line in the two dimensionally arranged plurality of pixels; pre-decoding the image data for the N-th row line using the delta data if the delta data has a size equal to or larger than a threshold while keeping the image data for the N-th row line using the delta data if the delta data has a size smaller than the threshold so as to generate intermediate codes using the computing device; and decoding and rendering the kept undecoded lines in the generated intermediate codes while rendering the decoded lines in the generated intermediate codes using the computing device.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
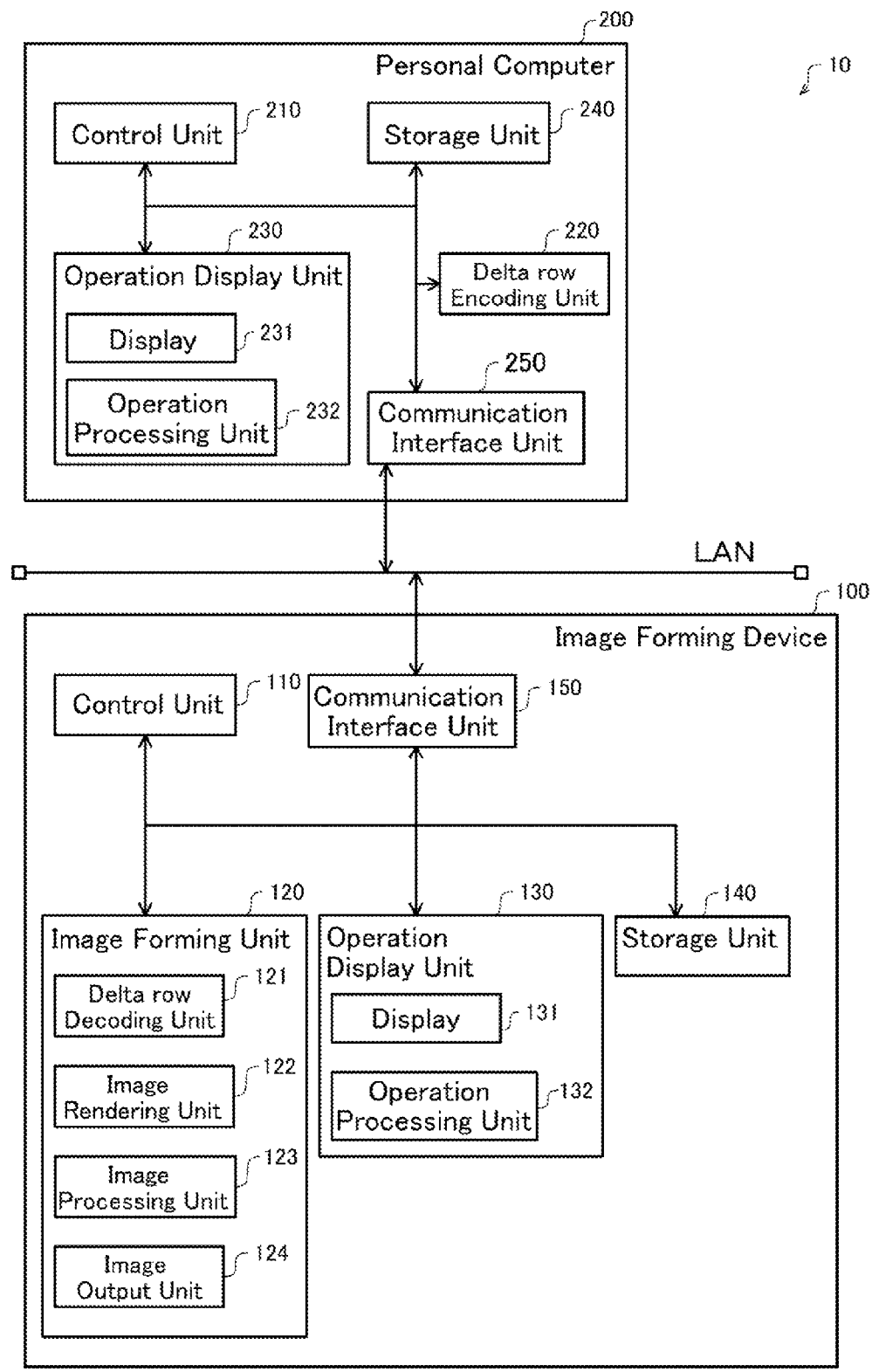
FIG. 1 illustrates a block diagram representing a functional configuration of an image forming system 10 according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes embodiments of the disclosure (hereinafter referred to as, the "embodiments") comparing with a comparative example with reference to the drawings.

FIG. 1 illustrates a block diagram representing a functional configuration of an image forming system 10 according to one embodiment of the disclosure. The image forming system 10 includes an image forming device 100 and a personal computer 200. The personal computer 200 is connected to the image forming device 100 via a network (which is a LAN in this example).

The image forming device 100 includes a control unit 110, an image forming unit 120, an operation display unit 130, a storage unit 140, and a communication interface unit 150. The personal computer 200 includes a control unit 210, a delta row encoding unit 220, an operation display unit 230, a storage unit 240, and a communication interface unit 250. The delta row encoding unit 220 encodes image data to generate encoded image data using a delta row encoding.

The communication interface unit 150 and the communication interface unit 250 communicate using a Transmission Control Protocol/Internet Protocol (TCP/IP) suite. The communication interface unit 150 functions as a print data receiver in this embodiment. The print data receiver may receive print data via a discrete I/O interface.

The image forming unit 120 includes a delta row decoding unit 121, an image rendering unit 122, an image processing unit 123, and an image output unit 124. The delta row decoding unit 121 decodes the encoded image data by an inverse delta row encoding. The image rendering unit 122 renders the decoded image data to generate bit map data of the image. The image processing unit 123 processes the scan data in accordance with a print setting. The image output unit 124 prints an image on a printing medium based on the decoded print data. The image output unit 124 functions as a print executing unit.

The operation display unit 130 of the image forming device 100 includes a display 131 and an operation processing unit 132. The operation display unit 230 of the personal computer 200 includes a display 231 and an operation processing unit 232. The display 131, which functions as a touch panel, displays various menus as a receiving screen. The operation processing units 132 and 232 accept an input operation of a user from the display 131, which functions as a touch panel, and various kinds of buttons and switches (not illustrated).

The control units 110 and 210 include a main storage unit such as a RAM and a ROM, and a control unit such as a micro-processing unit (MPU) and a central processing unit (CPU). The control units 110 and 210 also include a controller function related to an interface such as various kinds of I/Os, a universal serial bus (USB), a bus, and other hardware, and control the entire image forming device 100 and the entire personal computer 200, respectively.

The storage units 140 and 240 are storage devices formed of such as a hard disk drive and a flash memory, which are non-transitory recording mediums, and store control programs and data of processes performed by the control units 110 and 210, respectively.

Figure 2:
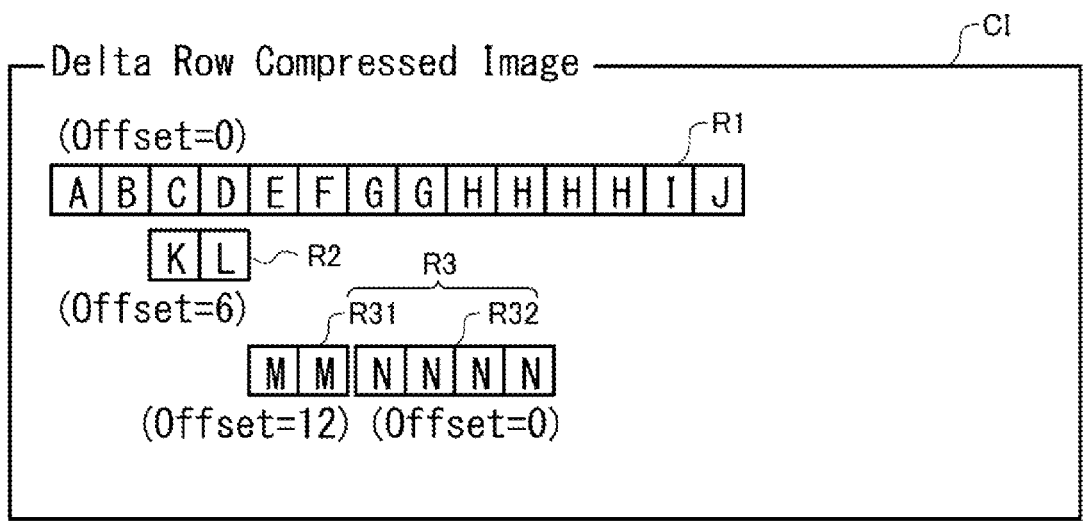
FIG. 2 illustrates a schematic drawing representing a typical delta row decoding according to a comparative example.
Figure 2:
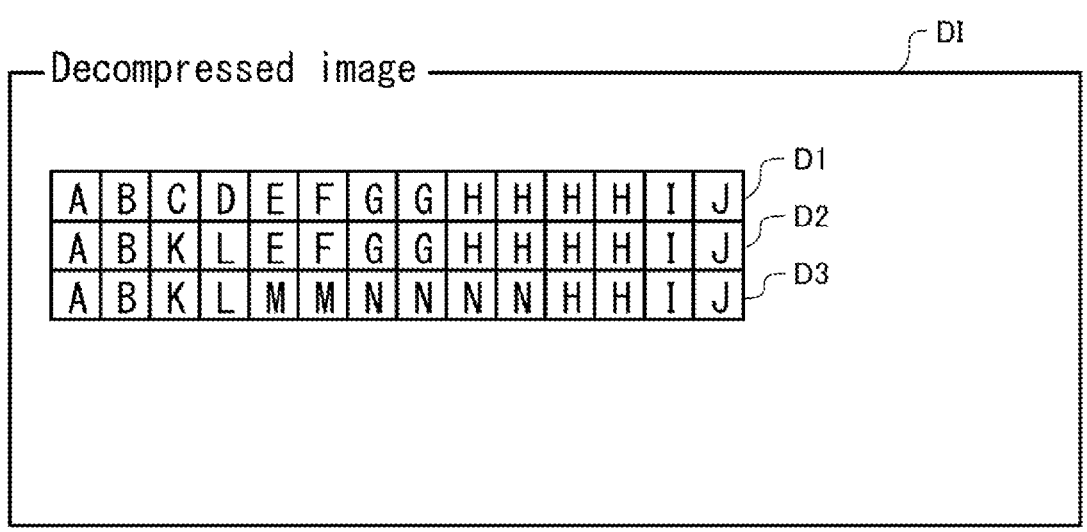

FIG. 2 illustrates a schematic drawing representing a typical delta row decoding according to a comparative example. This comparative example is described as one example of the delta row decoding process.

FIG. 2 illustrates delta row encoded image data CI and decoded image data DI. The delta row encoded image data CI is image data encoded from a plurality of pieces of original row data using the delta row encoding in the personal computer 200. The decoded image data DI is image data decoded from the delta row encoded image data CI using the inverse delta row encoding in the image forming device 100.

The delta row encoded image data CI includes the first encoded row data R1, the second encoded row data R2, and the third encoded row data R3. The decoded image data DI includes the first decoded row data D1, the second decoded row data D2, and the third decoded row data D3. The letters in pixels mean the respective colors of the pixels. The same letters indicate the same colors. The pixels in the first to fourth columns respectively include the letters "A," "B," "C," and "D."

The first encoded row data R1 has an offset number of zero. The first decoded row data D1 is generated by simply copying the first encoded row data R1. The second encoded row data R2 includes a delta between the first original row data and the second original row data. The second encoded row data R2 includes a part of image with an offset number of 6, which is calculated by 2 pixels times 3 colors for RGB. The part of image has the letters "K" and "L" in the third column and the fourth column, respectively.

The offset number of 6 means that there is no difference between the first original row data and the second original row data in the first and second columns of "A" and "B."

The offset number of six means that there is difference between the first original row data and the second original row data starting from the third column.

In the third column, the first original row data has the letter "C" while the second original row data has the letter "K." In the fourth column, the first original row data has the letter "D" while the second original row data has the letter "L." Thus, the third original row data is encoded into the second encoded row data R2 having only the two columns (two pixels) of data. This encoding saves data for the rest of the columns (pixels), which include the first pixel, the second pixel, and the fifth to fourteenth pixels.

The delta row decoding unit 121 decodes the second encoded row data R2 as follows. The delta row decoding unit 121 copies the first decoded row data D1 and then updates the third and fourth pixels from "C" and "D" to "K" and "L." This decoding process generates the second decoded row data D2.

The third encoded row data R3 includes the first part of image R31 and the second part of image R32. The first part of image R31 has the first offset number of 12, which is calculated by 4 pixels times 3 colors for RGB, and has the letter "M" in the fifth and sixth columns. The second part of image R32 has the second offset number of 0, which is calculated by 0 pixels times 3 colors for RGB from the first part of image R31, and has the letter "N" in the seventh to tenth columns.

The first offset number of 12 means that there is no difference between the second original row data and the third original row data in the first to fourth columns of "A," "B," "K," and "L." The part of image R31 has the letter "M" in the fifth and sixth columns. The second offset number of 0 means that there is difference between the first original row data and the second original row data starting from the next or the seventh column. The second part of image R32 has the letter "N" in the seventh to tenth columns.

The delta row decoding unit 121 decodes the third encoded row data R3 as follows. The delta row decoding unit 121 copies the second decoded row data D2 and then respectively updates the fifth and sixth columns from "E" and "F" to "M" and "M." The delta row decoding unit 121 further updates the seventh to tenth columns from "G," "G," "H," and "H" to "N," "N," "N," and "N," respectively.

Figure 3:
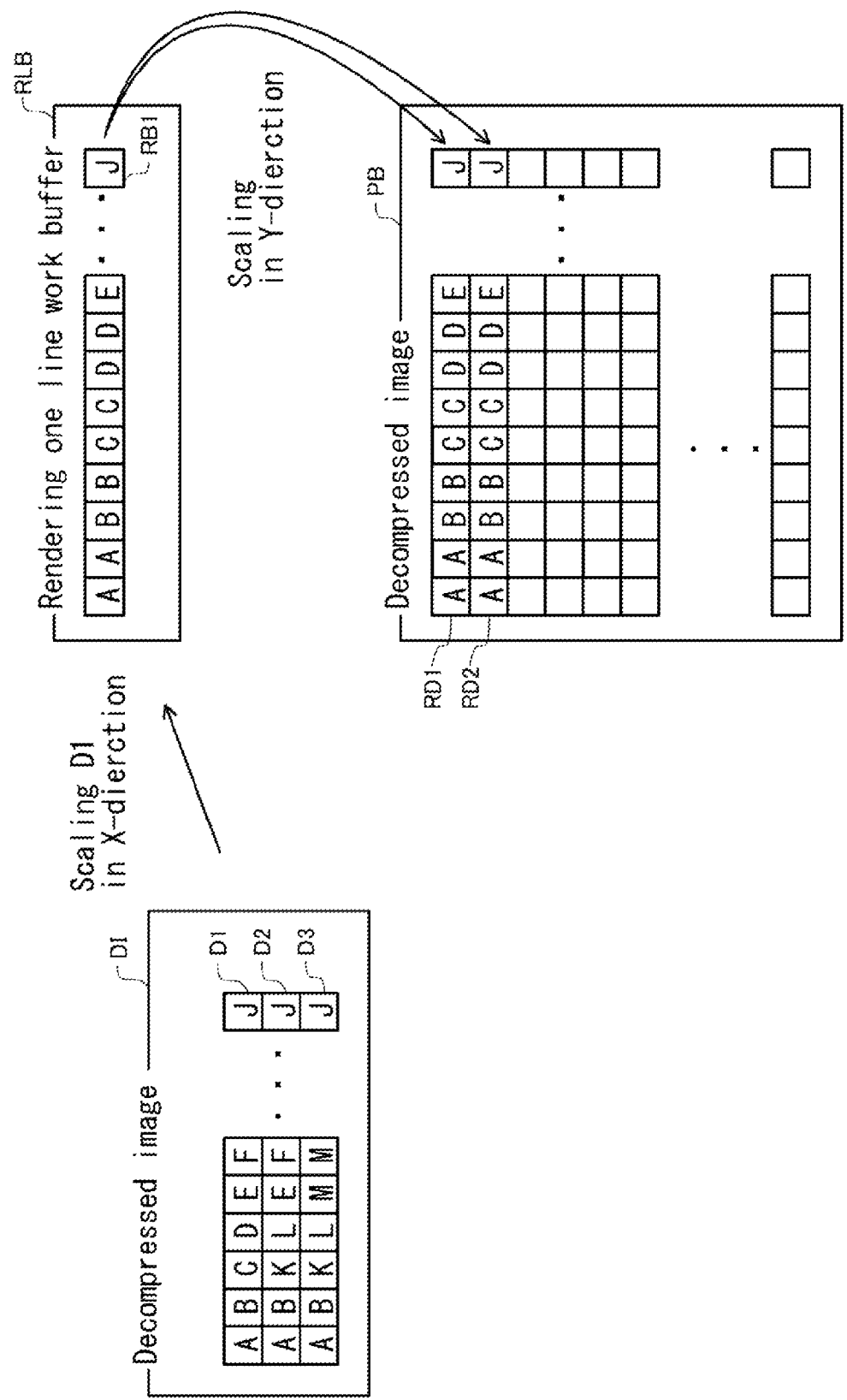
FIG. 3 illustrates a schematic drawing representing a typical image rendering process according to the comparative example.

FIG. 3 illustrates a schematic drawing representing a typical image rendering process according to the comparative example. The image rendering unit 122 renders the decoded image data DI to generate bit map data RD of the image by pixel replication. The scaling factor is 2 in X-direction (row direction) and Y-direction (column direction).

The image rendering unit 122 replicate the pixels in the first decoded row data D1 in X-direction using a rendering one line work buffer RLB, thus generating the rendered line data RB1. The image rendering unit 122 replicates the pixels in the rendered line data RB1 in Y-direction, thus generating the rendered rows data RD1 and RD2 in a page buffer PB.

Figure 4:
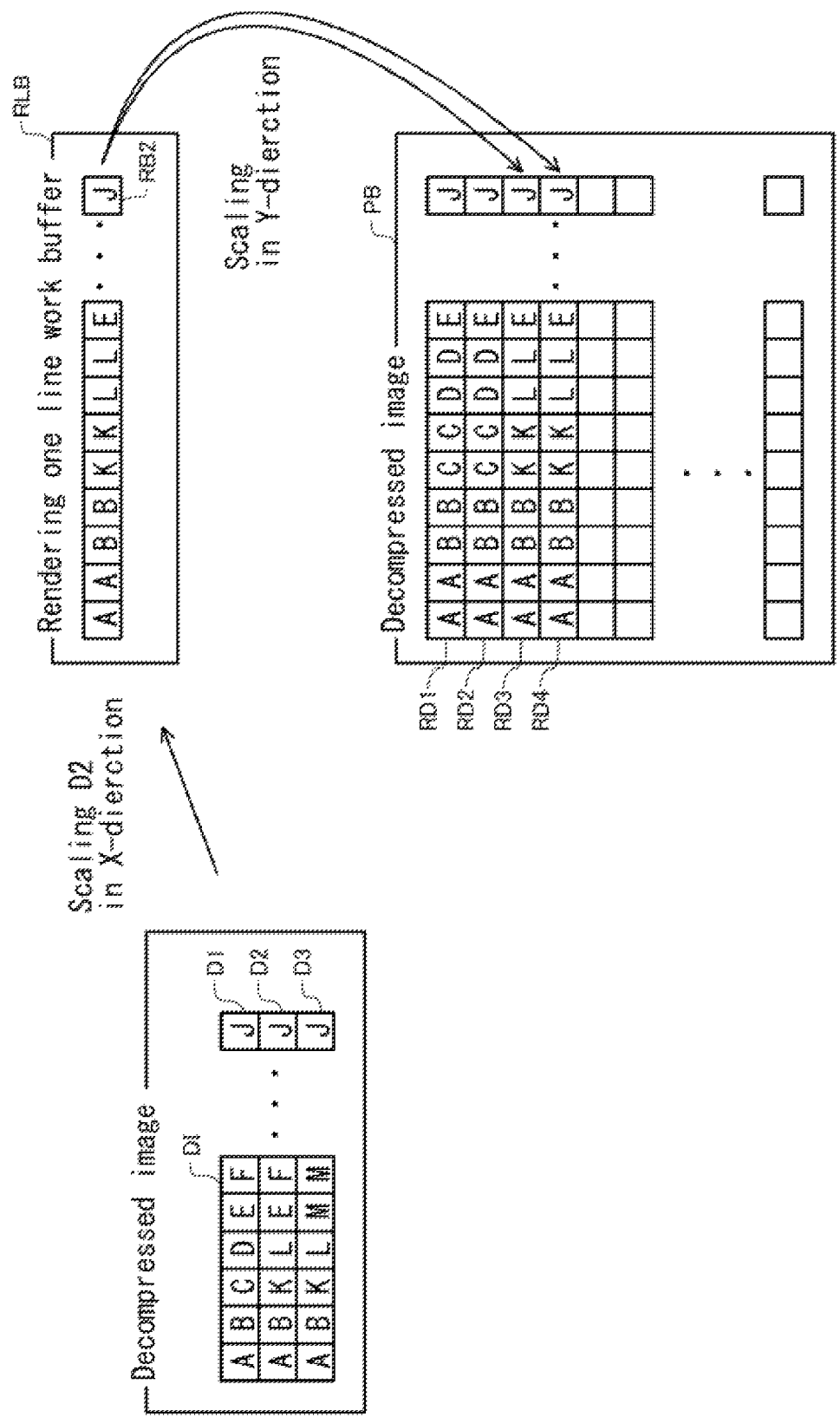
FIG. 4 illustrates a schematic drawing representing the typical image rendering process according to the comparative example.

FIG. 4 illustrates a schematic drawing representing the typical image rendering process according to the comparative example. The image rendering unit 122 replicate the pixels in the first decoded row data D2 in X-direction using one line buffer LB, thus generating the rendered line data RB2. The image rendering unit 122 replicates the pixels in the rendered line data RB2 in Y-direction, thus generating the rendered rows data RD3 and RD4 in the page buffer PB.

Figure 5:
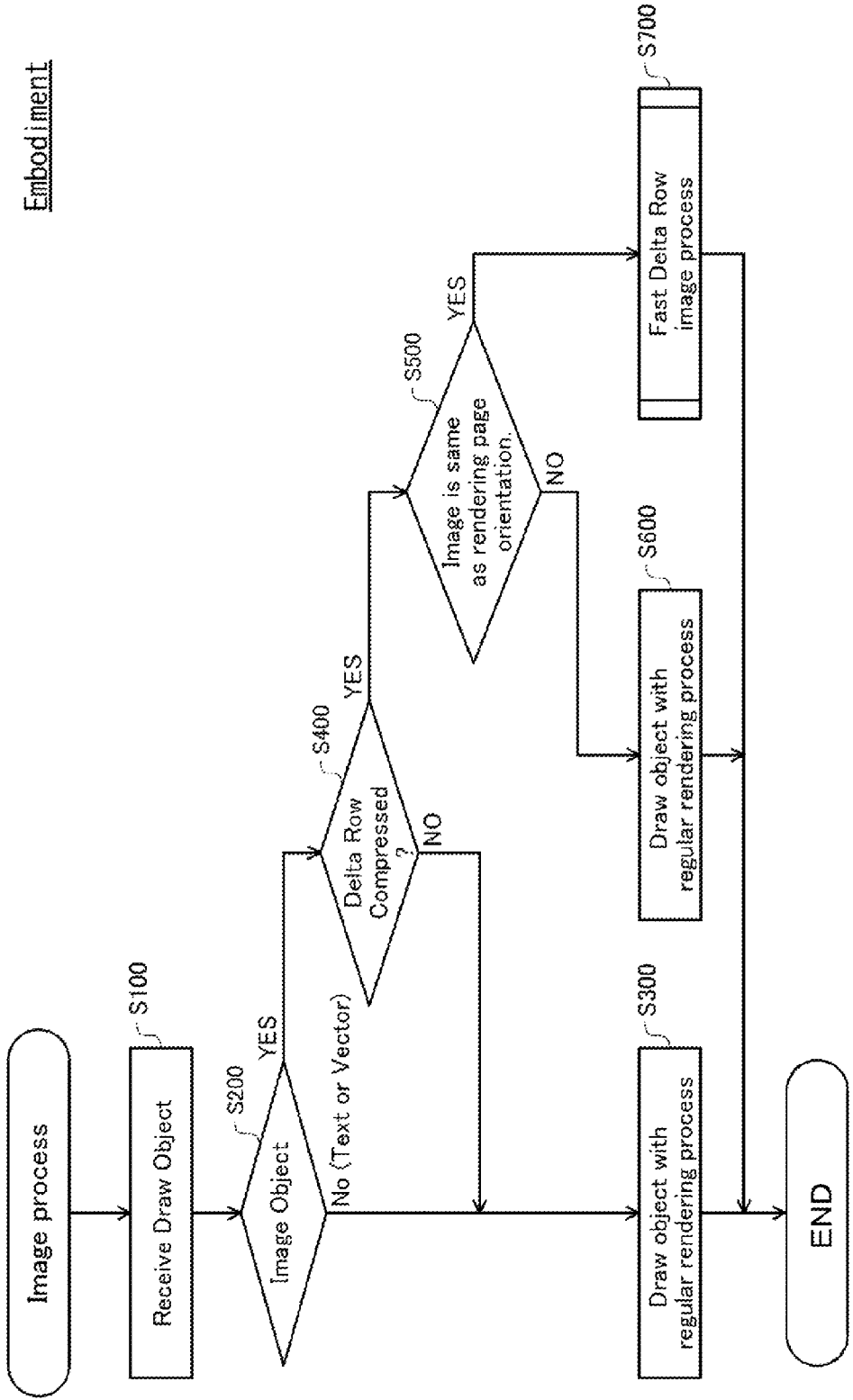
FIG. 5 illustrates a flow chart representing an image process according to one embodiment.

FIG. 5 illustrates a flow chart representing an image process according to one embodiment. At Step S100, the image forming device 100 receives a draw object from the personal computer 200 using the communication interface unit 250 and the communication interface unit 150.

At Step S200, the image forming unit 120 analyzes the received draw object to find whether the received draw object is an image object or not. If the received draw object is found to be an image object, the image forming unit 120 advances the process to Step S400. If the received draw object is found to be an object, such as text and vector data, other than an image object, the image forming unit 120 advances the process to Step S300. At Step S300, the image forming unit 120 draws the object with a regular rendering process.

At Step S400, the image rendering unit 122 analyzes the received draw object to find whether the received draw object is compressed by delta row encoding. If the received draw object is found to be compressed by delta row encoding, the image forming unit 120 advances the process to Step S500. If the received draw object is not compressed by delta row encoding, the image forming unit 120 advances the process to Step S300.

At Step S500, the image rendering unit 122 analyzes the received draw object to find whether the image has the same orientation as the rendering page orientation or unrotated. If the image has the same orientation, the image forming unit 120 advances the process to Step S700. If the image does not have the same orientation, the image forming unit 120 advances the process to Step S600. At Step S600, the image forming unit 120 draws the image object with a regular image rendering process.

Figure 6:
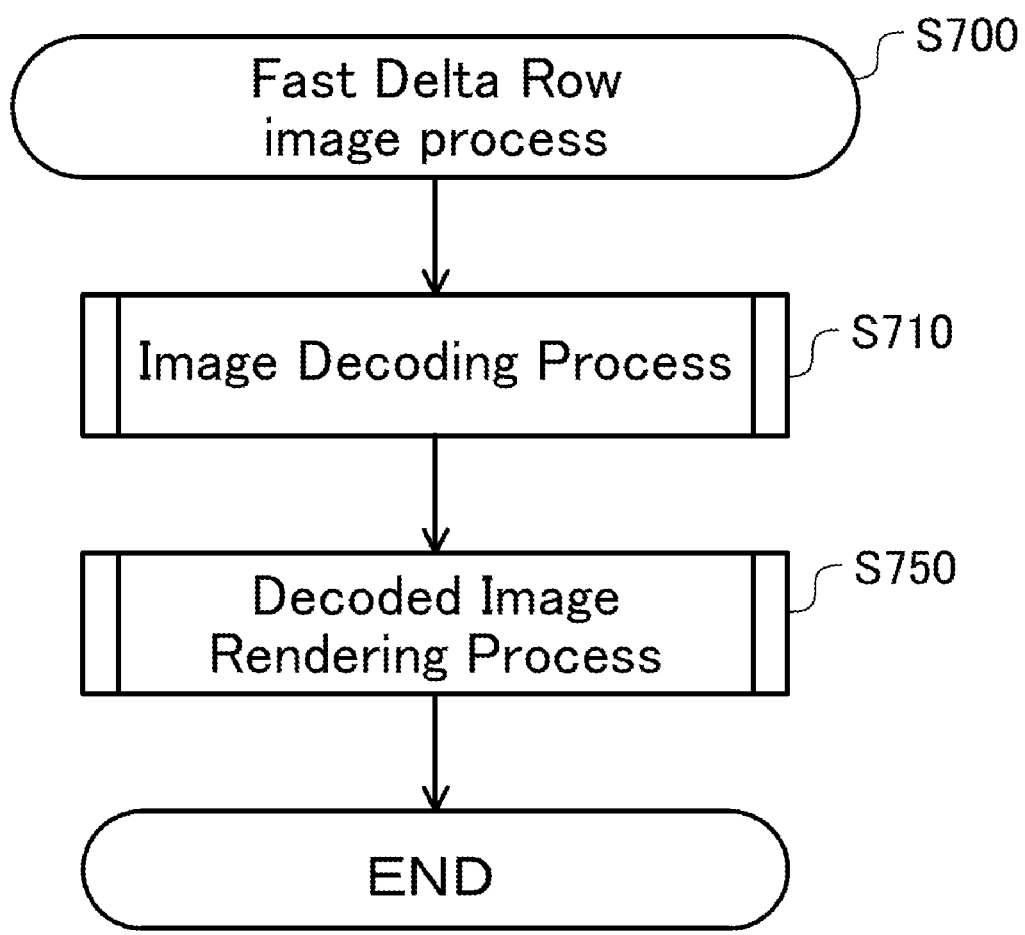
FIG. 6 illustrates a flow chart representing a fast delta row (FDR) image process according to the one embodiment.

FIG. 6 illustrates a flow chart representing a fast delta row image process according to the one embodiment. At Step S700, the image rendering unit 122 performs a fast delta row image process (also referred to as FDR image process). The FDR image process includes a step of decoding images and a step of rendering the decoded images.

Figure 7:
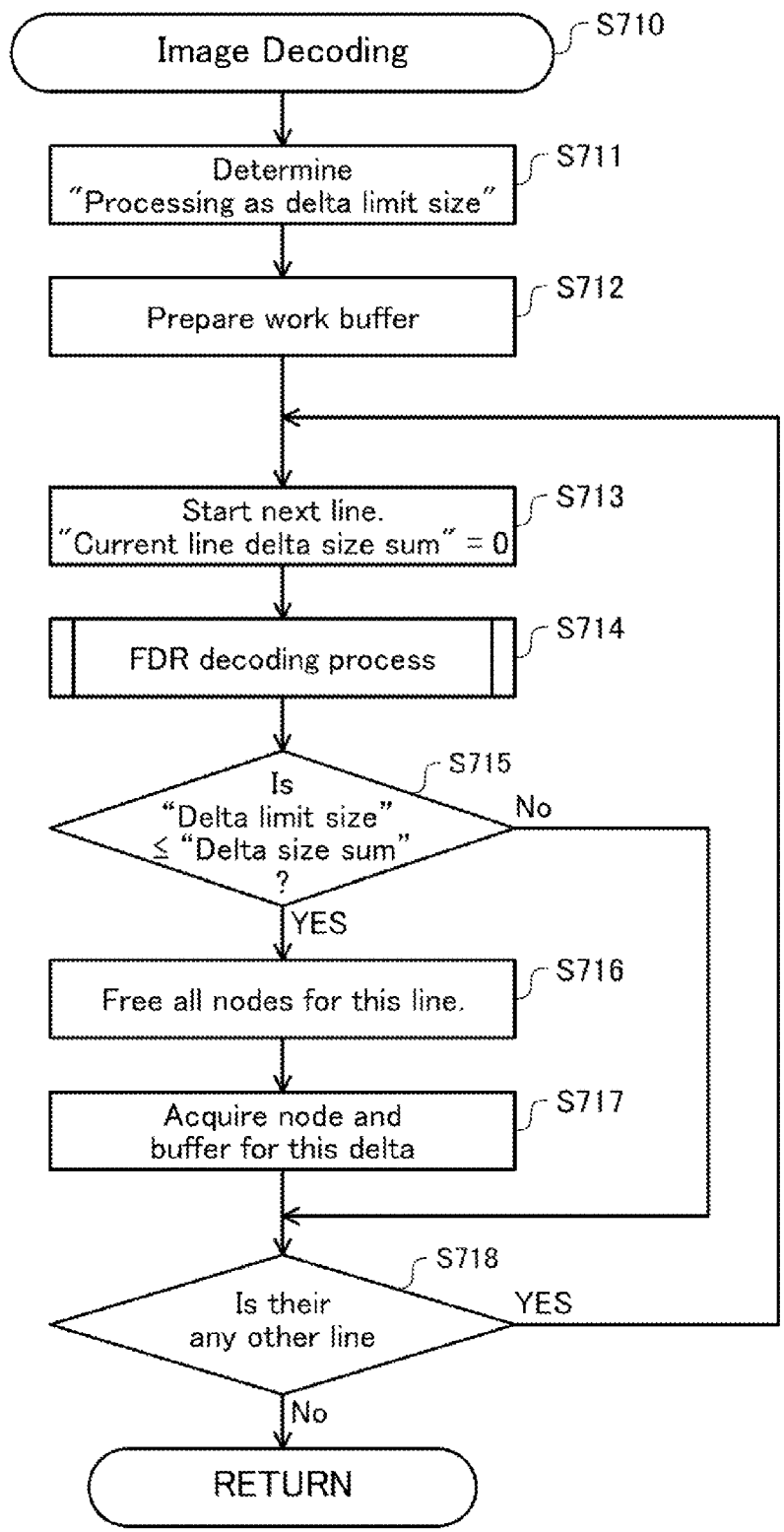
FIG. 7 illustrates a flow chart representing an image decoding process of the fast delta row image process according to the one embodiment.

FIG. 7 illustrates a flow chart representing an image decoding process of the fast delta row image process according to the one embodiment. At Step S711, the delta row decoding unit 121 determines "processing as delta limit size," which is also simply referred to as "delta limit size."

The delta row decoding unit 121 reads out a predetermined "ratio for processing as delta limit" of 0.25 from the storage unit 140. The delta row decoding unit 121 multiplies "input image one line buffer size" by the ratio for processing as delta limit of 0.25. The input image one line buffer size is 42, which is calculated by multiplying the number of pixels of 14 or image width in one line by 3 colors of RGB. Thus, the calculated delta limit size is 10.5.

Figure 8:
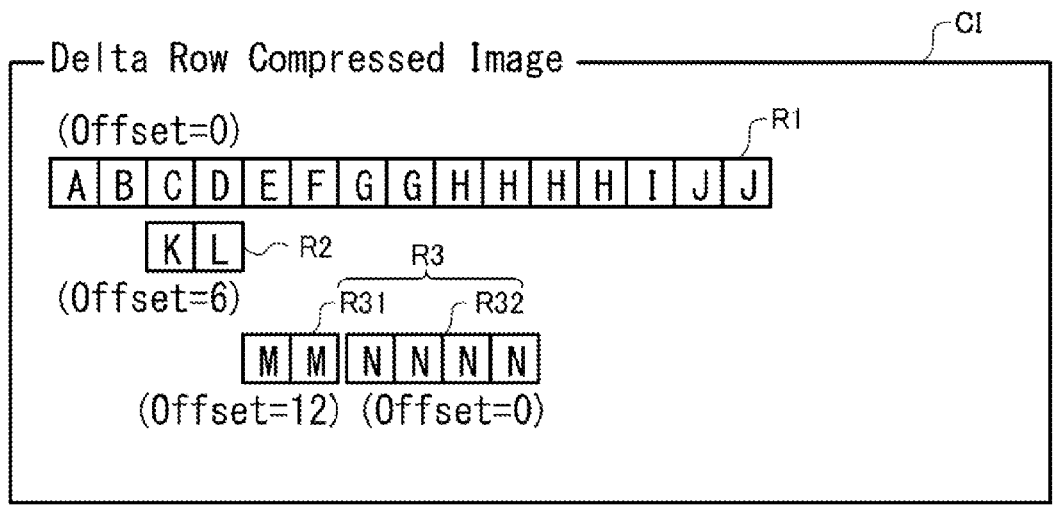
FIG. 8 illustrates a schematic drawing representing an FDR decoding according to the one embodiment.
Figure 8:
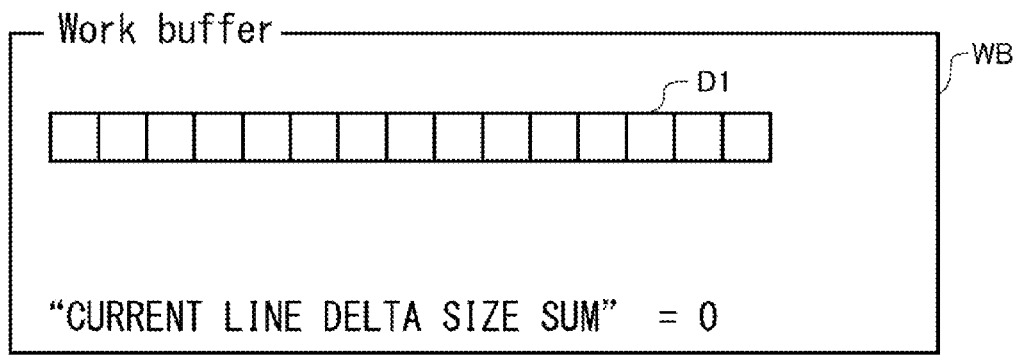
Figure 8:
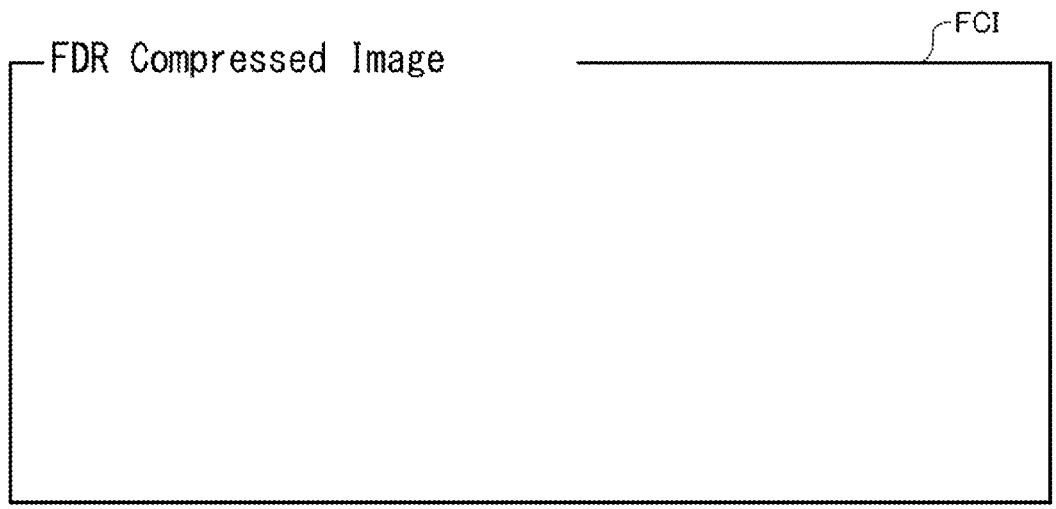

FIG. 8 illustrates a schematic drawing representing an FDR decoding according to the one embodiment. At Step S712, the delta row decoding unit 121 prepares the work buffer WB. The work buffer WB has the same size as the input image one line buffer size. At Step S713, the delta row decoding unit 121 initializes the current line delta size sum to 0, which is also simply referred to as "delta size sum." At Step S714, the delta row decoding unit 121 performs an FDR decoding process.

Figure 9:
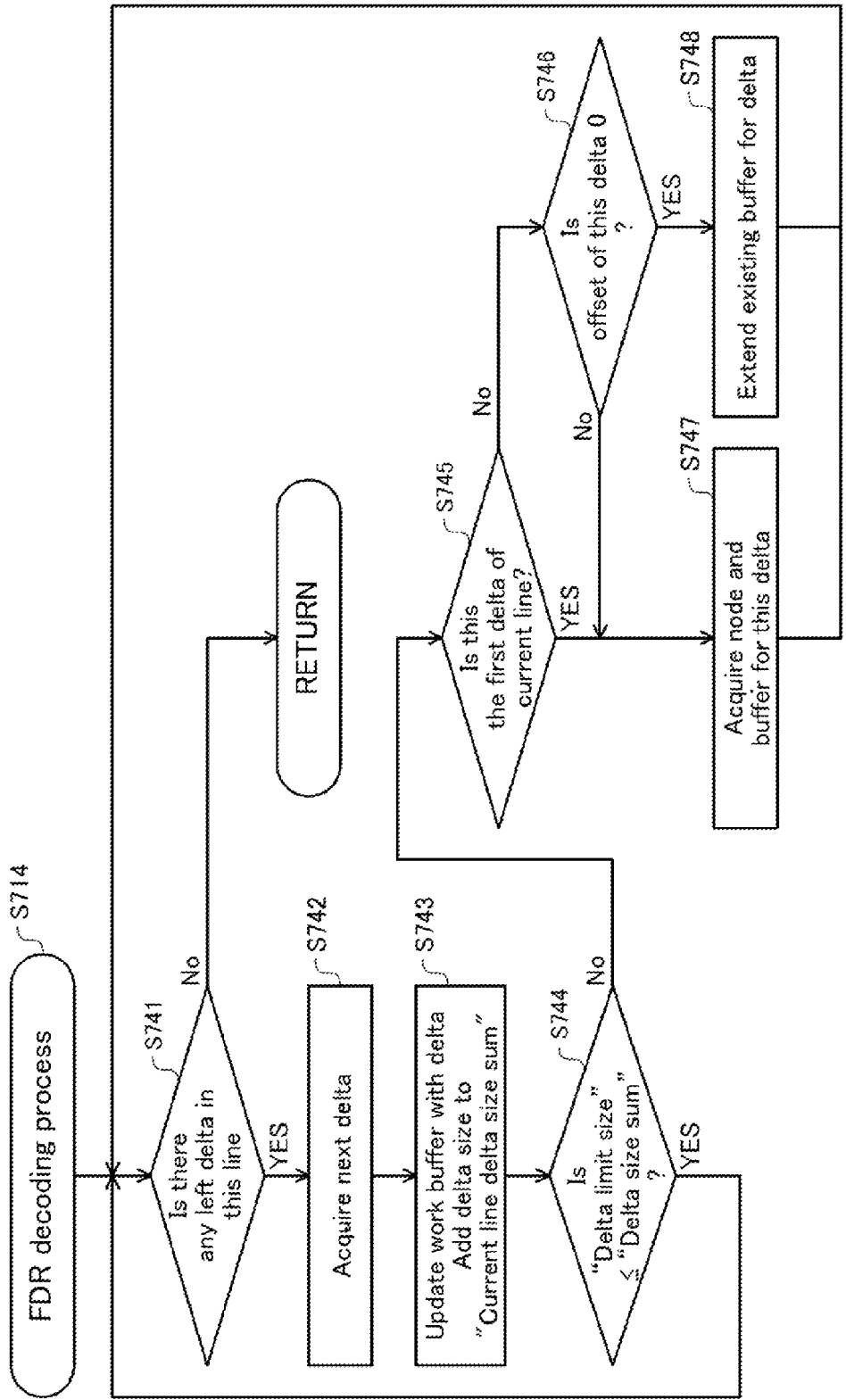
FIG. 9 illustrates a flow chart representing a fast delta row image decoding process according to the one embodiment.

FIG. 9 illustrates a flow chart representing a fast delta row image decoding process according to the one embodiment. At Step S741, the delta row decoding unit 121 determines whether there is any delta left in this line or not. If there is any delta left in this line, the delta row decoding unit 121 advances the process to Step S742. If there is no left delta in this line, the delta row decoding unit 121 advances the process to Step S715 (see FIG. 7).

In this case, there is a delta of the first encoded row data R1. Thus, the delta row decoding unit 121 advances the process to Step S742. At Step S742, the delta row decoding unit 121 acquires the delta of the first encoded row data R1, the entire of which is the delta because there is no prior encoded row data.

Figure 10:
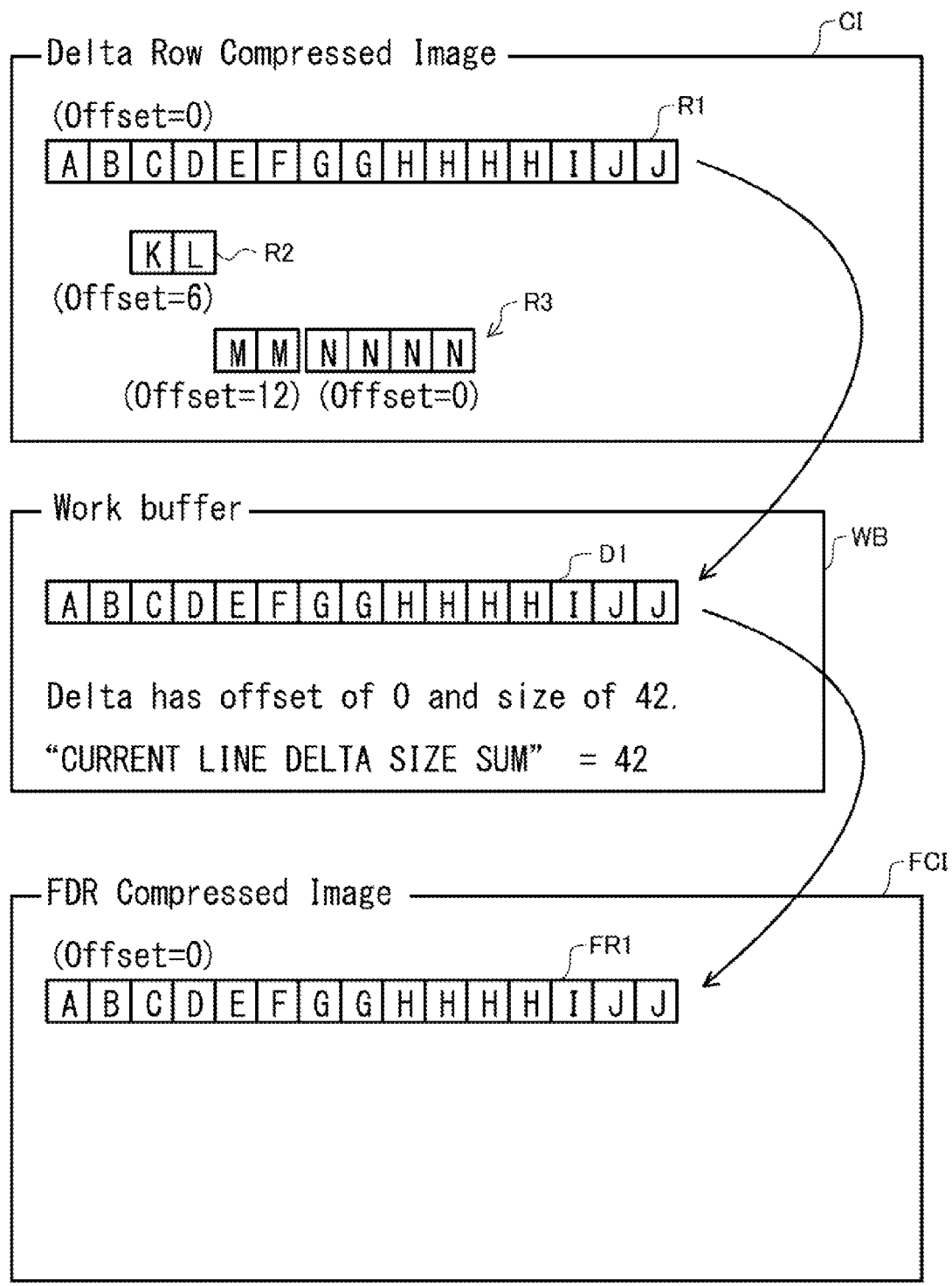
FIG. 10 illustrates a schematic drawing representing an FDR decoding according to the one embodiment.

FIG. 10 illustrates a schematic drawing representing the FDR decoding according to the one embodiment. At Step S743, the delta row decoding unit 121 updates the work buffer WB with the delta of the first encoded row data R1 and adds the delta size of 42, which is one line buffer size, to the current line delta size sum. The delta size of 42 is calculated by multiplying the number of pixels of 14 or image width in one line by 3 colors of RGB because the entire line is updated.

At Step S744, the delta row decoding unit 121 determines whether the delta size sum is equal to or larger than the delta limit size or not. If the delta size sum is equal to or larger than the delta limit size, the delta row decoding unit 121 returns the process to Step S741. If the delta size sum is smaller than the delta limit size, the delta row decoding unit 121 advances the process to Step S745. In this case, the delta size sum is 42 while the delta limit size is 10.5 (which means YES). Thus, the delta row decoding unit 121 returns the process to Step S741.

At Step S741, the delta row decoding unit 121 determines whether there is any delta left in this line or not. If there is any delta left in this line, the delta row decoding unit 121 advances the process to Step S742. If there is no left delta in this line, the delta row decoding unit 121 advances the process to Step S715 (see FIG. 7). In this case, there is no left delta in the first encoded row data R1. Thus, the delta row decoding unit 121 advances the process to Step S715 (see FIG. 7).

At Step S715, the delta row decoding unit 121 determines whether the delta size sum is equal to or larger than the delta limit size or not. In this case, the delta size sum is 42 while the delta limit size is 10.5 (which means YES). Thus, the delta row decoding unit 121 advances the process to Step S716.

At Step S716, the delta row decoding unit 121 frees all the nodes for this line. At Step S717, the delta row decoding unit 121 acquires a node and a line buffer for this delta of the first encoded row data R1. The line buffer has the same size as the input image one line buffer size. The delta row decoding unit 121 copies the work buffer WB to this line buffer, which constitutes a part of an FDR compressed image FCI as FDR encoded row data FR1.

At Step S718, the delta row decoding unit 121 determines whether there is any other line or not. If there is any other line, the delta row decoding unit 121 returns the process to Step S713. If there is no line left, the delta row decoding unit 121 advances the process to Step S750 (see FIG. 6). In this case, there are other lines. Thus, the delta row decoding unit 121 returns the process to Step S713.

At Step S713, the delta row decoding unit 121 initializes the current line delta size sum to 0. At Step S741, the delta row decoding unit 121 determines whether there is any delta left in this line. In this case, there is a delta as the second encoded row data R2. Thus, the delta row decoding unit 121 advances the process to Step S742. At Step S742, the delta row decoding unit 121 acquires the delta of the second encoded row data R2.

Figure 11:
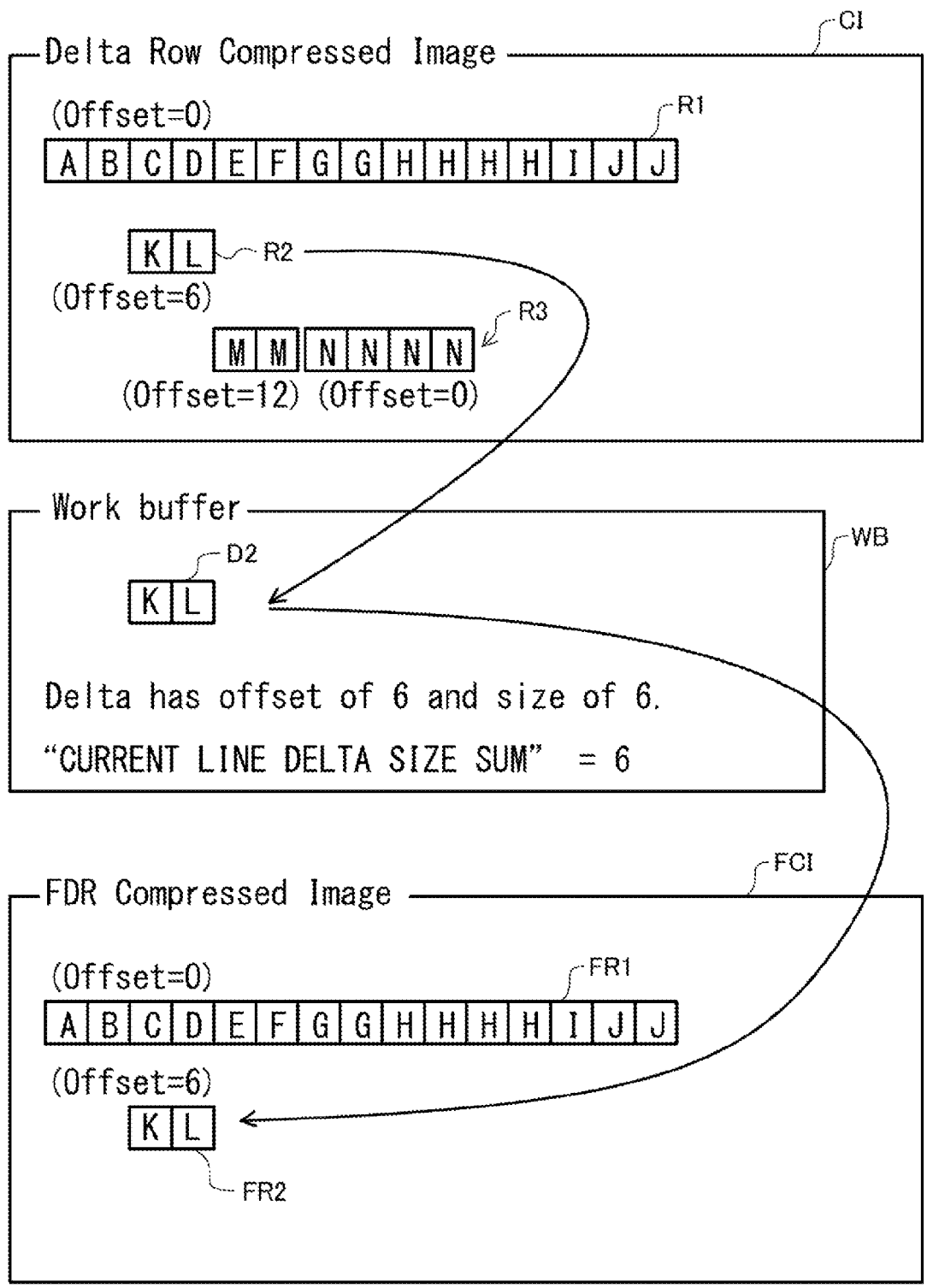
FIG. 11 illustrates a schematic drawing representing the FDR decoding according to the one embodiment.

FIG. 11 illustrates a schematic drawing representing the FDR decoding according to the one embodiment. At Step S743, the delta row decoding unit 121 updates the work buffer WB with the delta of the second encoded row data R2 and adds the delta size of 6, which is calculated by 2 pixels times 3 colors for RGB, to the delta size sum.

At Step S744, the delta row decoding unit 121 determines whether the delta size sum is equal to or larger than the delta limit size or not. In this case, since the delta size sum of 6 is smaller than the delta limit size, the delta row decoding unit 121 advances the process to Step S745.

At Step S745, the delta row decoding unit 121 determines whether this is the first delta of current line or not. If this is the first delta of current line, the delta row decoding unit 121 advances the process to Step S747. If this is not the first delta of current line, the delta row decoding unit 121 advances the process to Step S746. At Step S746, the delta row decoding unit 121 extends the buffer for this the delta in the FDR compressed image FCI if the offset of this delta is 0 at Step S748. In this case, since this is the first delta of current line, the delta row decoding unit 121 advances the process to Step S747.

At Step S747, the delta row decoding unit 121 acquires a node and allocates a line buffer for the delta of the second encoded row data R2. The node has the offset number of 6. The line buffer has the same size as the delta size of 6. The delta row decoding unit 121 copies the work buffer WB to this line buffer, which constitutes a part of the FDR compressed image FCI as FDR encoded row data FR2.

The delta row decoding unit 121 returns the process to Step S741. In this case, there is no left delta in the second encoded row data R2. Thus, the delta row decoding unit 121 advances the process to Step S715.

At Step S715, the delta row decoding unit 121 determines whether the delta size sum is equal to or larger than the delta limit size or not. In this case, the delta size sum is 6 while the delta limit size is 10.5 (which means NO). Thus, the delta row decoding unit 121 advances the process to Step S718.

At Step S718, the delta row decoding unit 121 determines whether there is any other line or not. In this case, there is another line of the third encoded row data R3. Thus, the delta row decoding unit 121 returns the process to Step S713.

At Step S713, the delta row decoding unit 121 initializes the current line delta size sum to 0. At Step S741, the delta row decoding unit 121 determines whether there is any delta left in this line or not. In this case, there are two deltas in the third encoded row data R3. Thus, the delta row decoding unit 121 advances the process to Step S742. At Step S742, the delta row decoding unit 121 acquires the first delta R31 in the third encoded row data R3.

Figure 12:
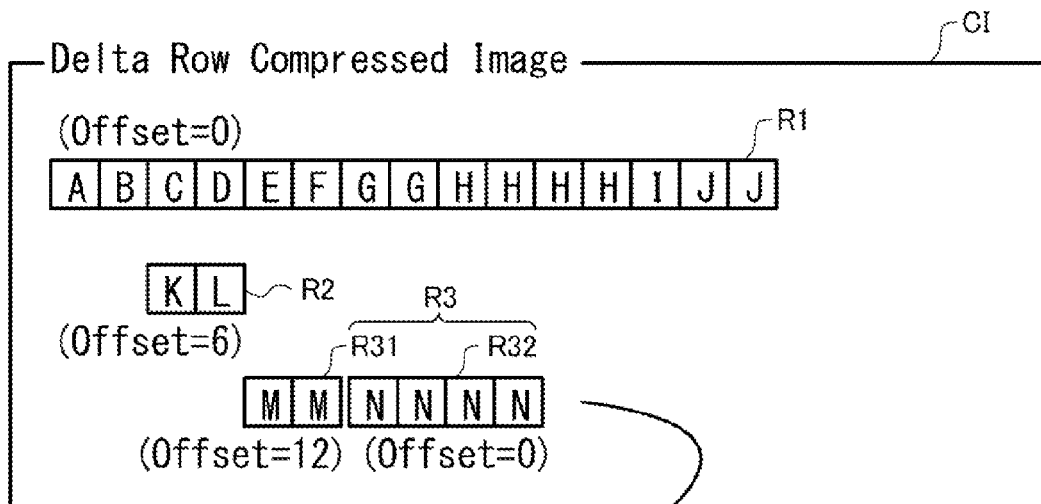
FIG. 12 illustrates a schematic drawing representing the FDR decoding according to the one embodiment.
Figure 12:
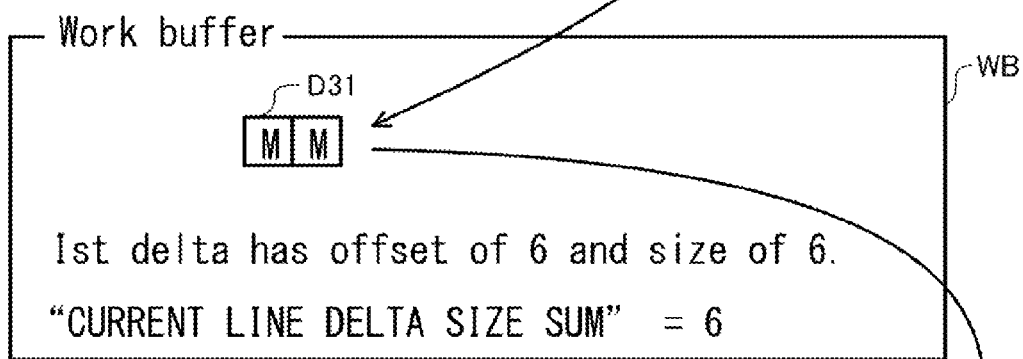
Figure 12:
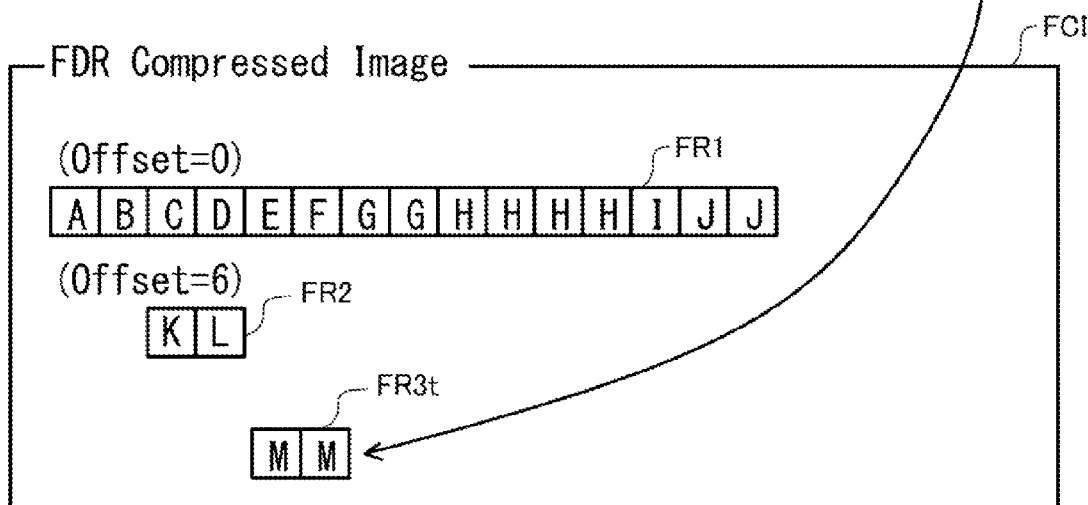

FIG. 12 illustrates a schematic drawing representing the FDR decoding according to the one embodiment. At Step S743, the delta row decoding unit 121 updates the work buffer WB with the first delta R31 in the third encoded row data R3 and adds the delta size of 6, which is calculated by 2 pixels times 3 colors for RGB, to the delta size sum.

At Step S744, the delta row decoding unit 121 determines whether the delta size sum is equal to or larger than the delta limit size or not. In this case, the delta size sum of 6 is smaller than the delta limit size, the delta row decoding unit 121 advances the process to Step S745.

At Step S745, the delta row decoding unit 121 determines whether this is the first delta of current line or not. In this case, this is the first delta of current line. Thus, the delta row decoding unit 121 advances the process to Step S747.

At Step S747, the delta row decoding unit 121 acquires a node and allocates a line buffer for the first delta R31 in the third encoded row data R3. The node has the first offset number of 12. The line buffer has the same size as the delta size of 6. The delta row decoding unit 121 copies the work buffer WB to this line buffer, which constitutes a part of the FDR compressed image FCI as FDR encoded row data FR3t, which is tentative due to the following second delta R32.

The delta row decoding unit 121 returns the process to Step S741. In this case, there is the second delta R32 left in the third encoded row data R3. Thus, the delta row decoding unit 121 advances the process to Step S742. At Step S742, the delta row decoding unit 121 acquires the second delta R32 in the third encoded row data R3.

Figure 13:
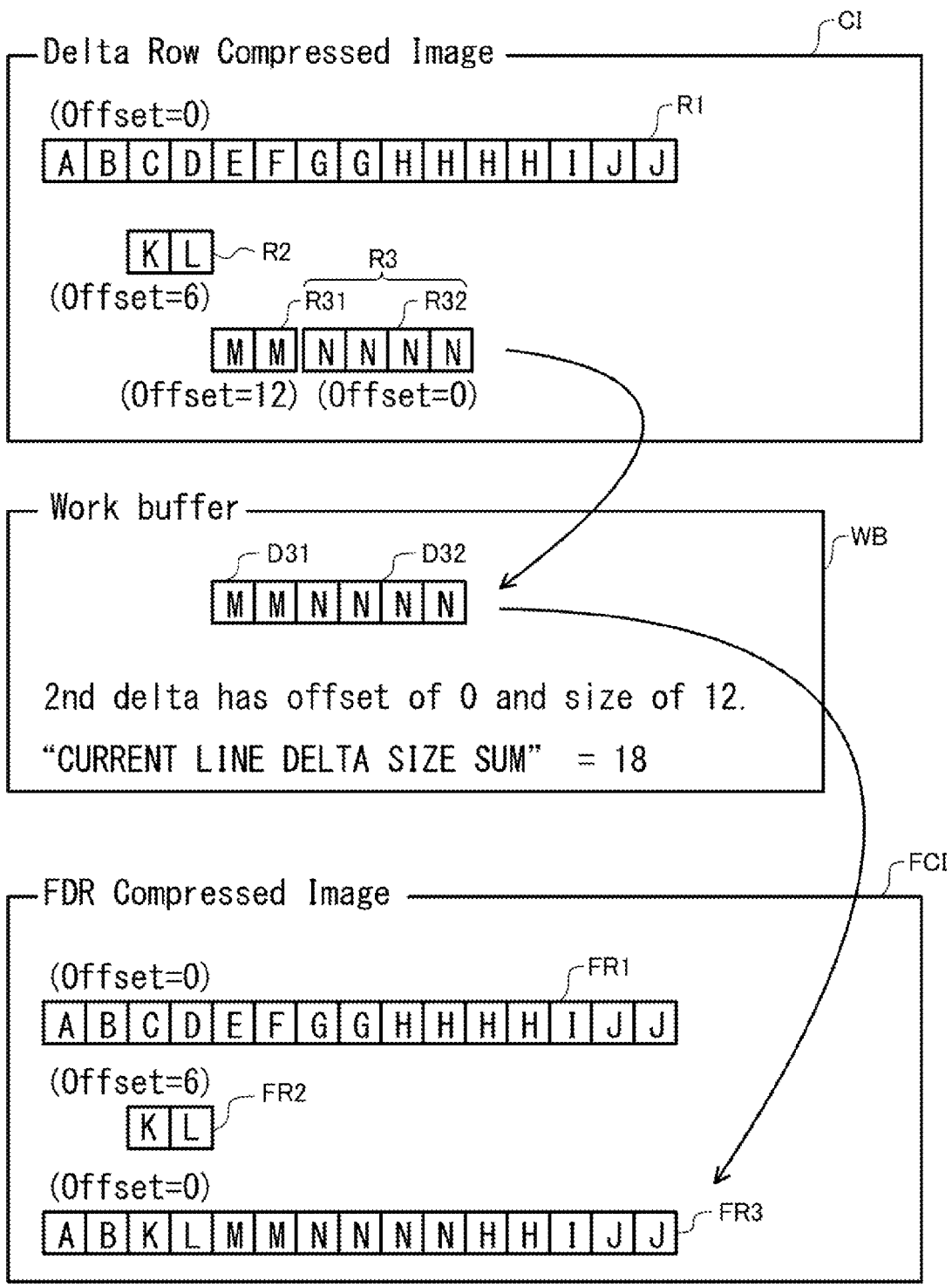
FIG. 13 illustrates a schematic drawing representing the FDR decoding according to the one embodiment.

FIG. 13 illustrates a schematic drawing representing the FDR decoding according to the one embodiment. At Step S743, the delta row decoding unit 121 updates the work buffer WB with the second delta R32 in the third encoded row data R3 and adds the delta size of 12, which is calculated by 4 pixels times 3 colors for RGB, to the delta size sum. This makes the delta size sum 18.

At Step S744, the delta row decoding unit 121 determines whether the delta size sum is equal to or larger than the delta limit size of 10.5 or not. In this case, the delta size sum is 18 while the delta limit size is 10.5 (which means YES). Thus, the delta row decoding unit 121 advances the process to Step S741.

At Step S744, if the delta size sum were smaller than the delta limit size (which means NO), the delta row decoding unit 121 would advance the process to Step S745. In this case, since this is not the first delta of current line, the delta row decoding unit 121 advances the process to Step S746. Since the offset of this delta is 0 at Step S746, the delta row decoding unit 121 extends the existing buffer and copies this delta to this extended portion of this line buffer. Then, the delta row decoding unit 121 advances the process to Step S741.

At Step S741, the delta row decoding unit 121 determines whether there is any delta left in this line or not. In this case, there is no left delta in the third encoded row data R3. Thus, the delta row decoding unit 121 advances the process to Step S715 (see FIG. 7).

At Step S715, the delta row decoding unit 121 determines whether the delta size sum is equal to or larger than the delta limit size or not. In this case, the delta size sum is 18 while the delta limit size is 10.5 (which means YES). Thus, the delta row decoding unit 121 advances the process to Step S716.

At Step S716, the delta row decoding unit 121 frees all the nodes for the work buffer WB. At Step S717, the delta row decoding unit 121 acquires a node and allocates a line buffer for the entire third encoded row data R3. The line buffer has the same size as the input image one line buffer size. The delta row decoding unit 121 copies the work buffer WB to this line buffer, which constitutes a part of the FDR compressed image FCI as FDR encoded row data FR3.

At Step S718, the delta row decoding unit 121 determines whether there is any other line or not. In this case, there is no line left. Thus, the delta row decoding unit 121 advances the process to Step S750 (see FIG. 6).

Figure 14:
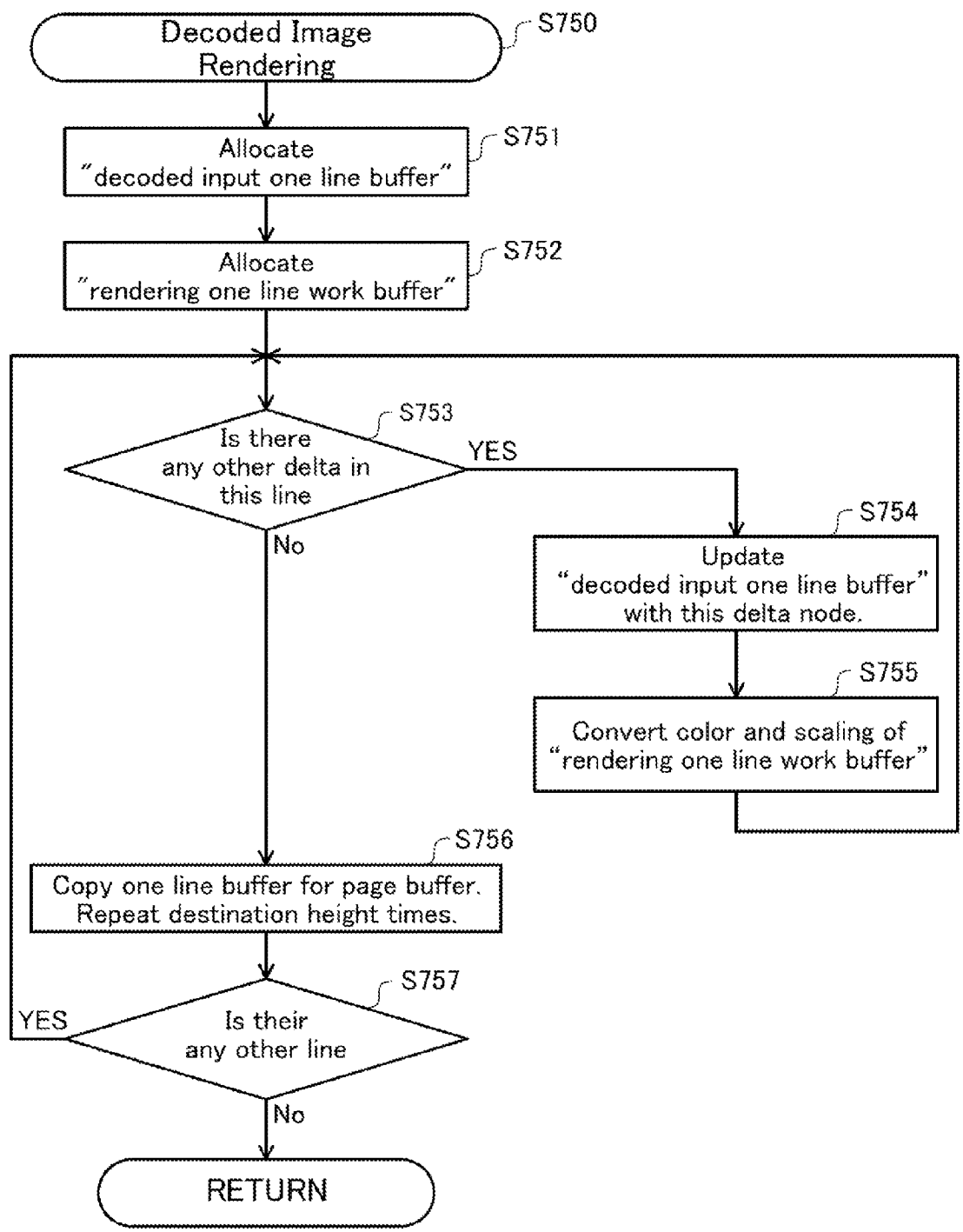
FIG. 14 illustrates a flow chart representing an image rendering process of decoded image according to the one embodiment.
Figure 15:
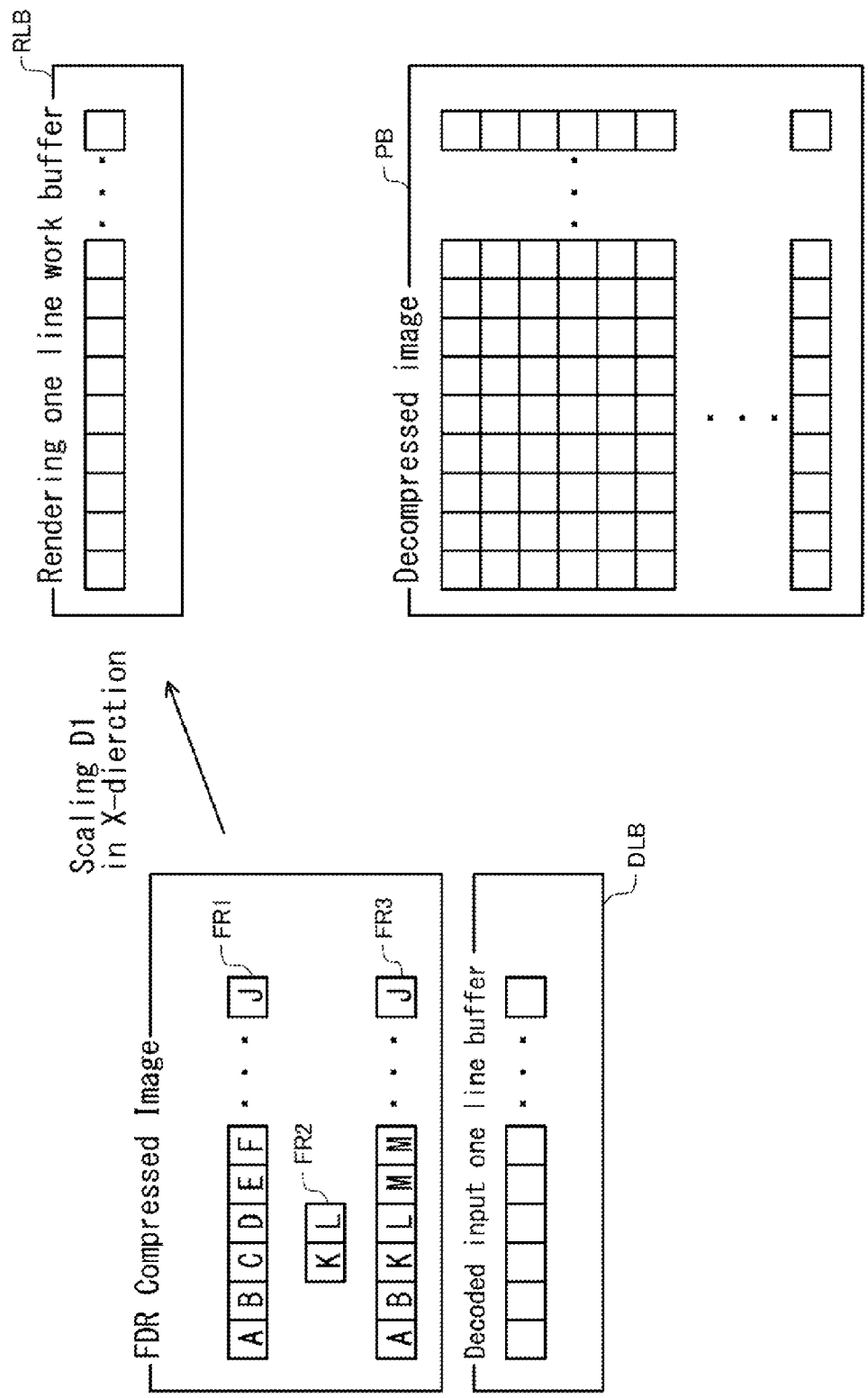
FIG. 15 illustrates a schematic drawing representing an image rendering process according to the one embodiment.

FIG. 14 illustrates a flow chart representing an image rendering process of decoded image according to the one embodiment. FIG. 15 illustrates a schematic drawing representing an image rendering process according to the one embodiment. At Step S751, the image rendering unit 122 allocates a decoded input one line buffer DLB. The decoded input one line buffer DLB has the same buffer size as the input image one line buffer size for the FDR encoded row data.

At Step S752, the image rendering unit 122 allocates a rendering one line work buffer RLB. The rendering one line work buffer RLB has a buffer size depending on a size of the original row data and the scaling factor in X-direction (row direction).

At Step S753, the delta row decoding unit 121 determines whether there is any delta left in this line. If there is any delta left in this line, the delta row decoding unit 121 advances the process to Step S754. If there is no left delta in this line, the delta row decoding unit 121 advances the process to Step S756. In this case, the delta row decoding unit 121 advances the process to Step S754.

Figure 16:
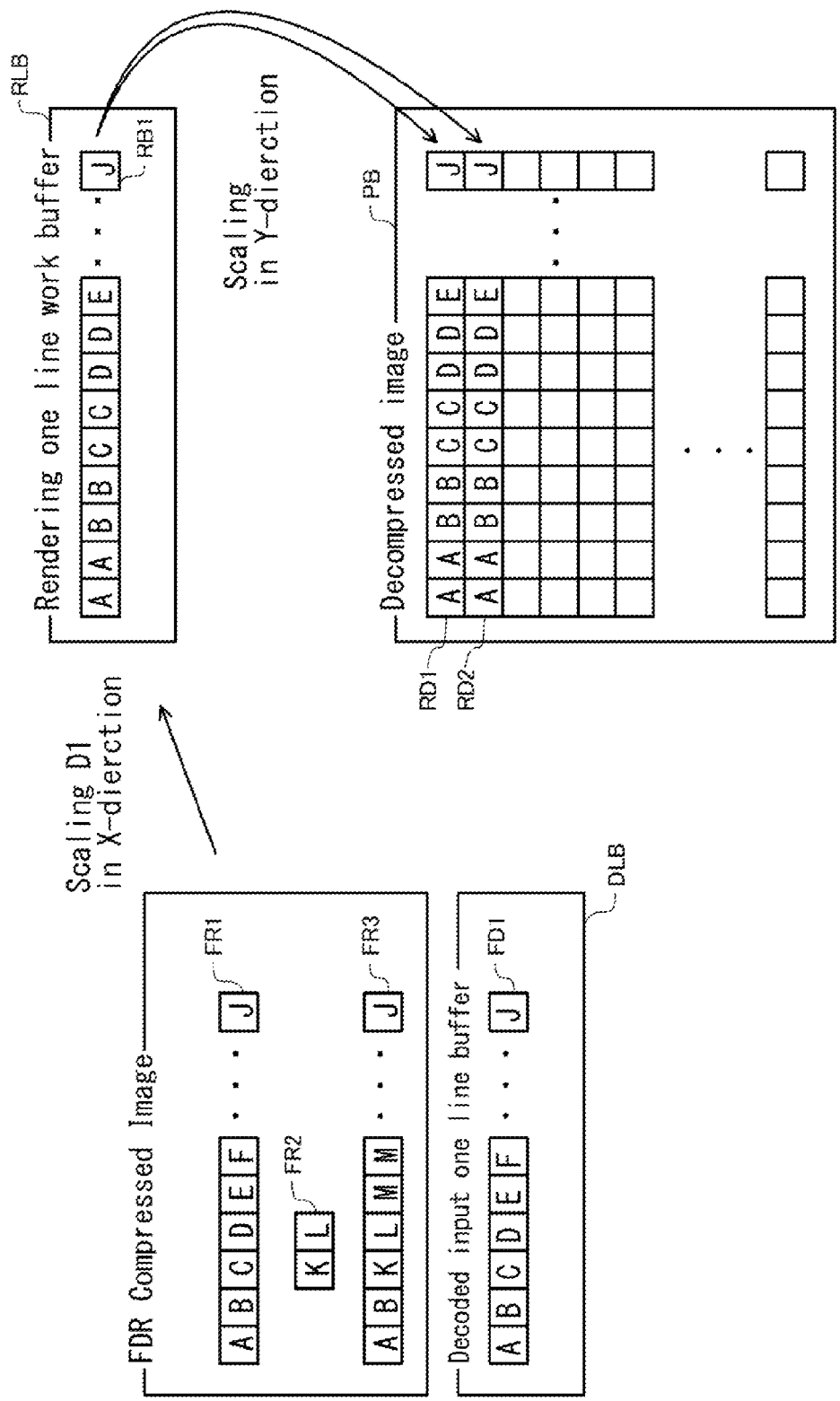
FIG. 16 illustrates a schematic drawing representing the image rendering process according to the one embodiment.

FIG. 16 illustrates a schematic drawing representing the image rendering process according to the one embodiment. The first FDR encoded row data FR1 has an offset number of zero. At Step S754, the first decoded input line data FD1 is generated by simply copying the first FDR encoded row data FR1, which is one kind of update.

At Step S755, the image processing unit 123 converts the respective colors of the first decoded input line data FD1 into CMY or CMYK, and subsequently the image rendering unit 122 renders the color converted data to generate one line bit map data RB1 of the image by pixel replication using the rendering one line work buffer RLB. The scaling factor is 2 in X-direction (row direction) and Y-direction (column direction), which means that the destination height time is 2.

At Step S753, since there is no left delta in this line, the delta row decoding unit 121 advances the process to Step S756. At Step S756, the image rendering unit 122 copies the one line bit map data RB1 and replicates or repeats the one line bit map data RB1 in Y-direction, thus generating the rendered rows data RD1 and RD2 in a page buffer PB.

Figure 17:
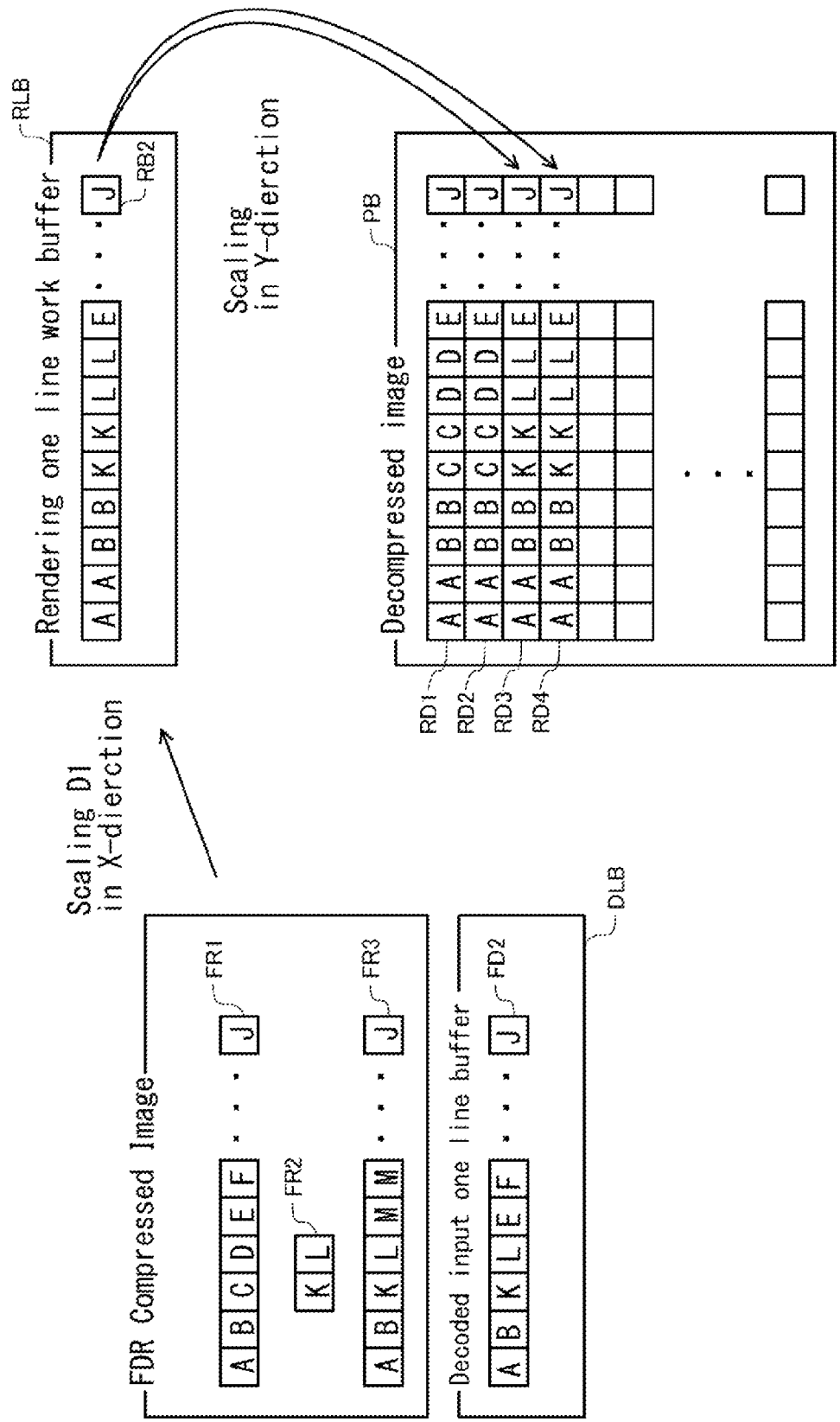
FIG. 17 illustrates a schematic drawing representing the image rendering process according to the one embodiment.

FIG. 17 illustrates a schematic drawing representing an image rendering process according to the one embodiment. At Step S757, since there is another line of the second FDR encoded row data FR2. Thus, the delta row decoding unit 121 returns the process to Step S753.

At Step S753, since there is a delta left the second decoded input line data FD2, the delta row decoding unit 121 advances the process to Step S754. At Step S754, the delta row decoding unit 121 updates the third and fourth pixels from "C" and "D" to "K" and "L" to generate the second decoded input line data FD2.

At Step S755, the image processing unit 123 converts the respective colors of the second decoded input line data FD2, and subsequently the image rendering unit 122 renders the color converted data to generate one line bit map data RB2 of the image by pixel replication using the rendering one line work buffer RLB.

At Step S753, since there is no left delta in this line, the delta row decoding unit 121 advances the process to Step S756. At Step S756, the image rendering unit 122 copies the one line bit map data RB2 and replicates or repeats the one line bit map data RB2 in Y-direction, thus generating the rendered rows data RD3 and RD4 in the page buffer PB.

Figure 18:
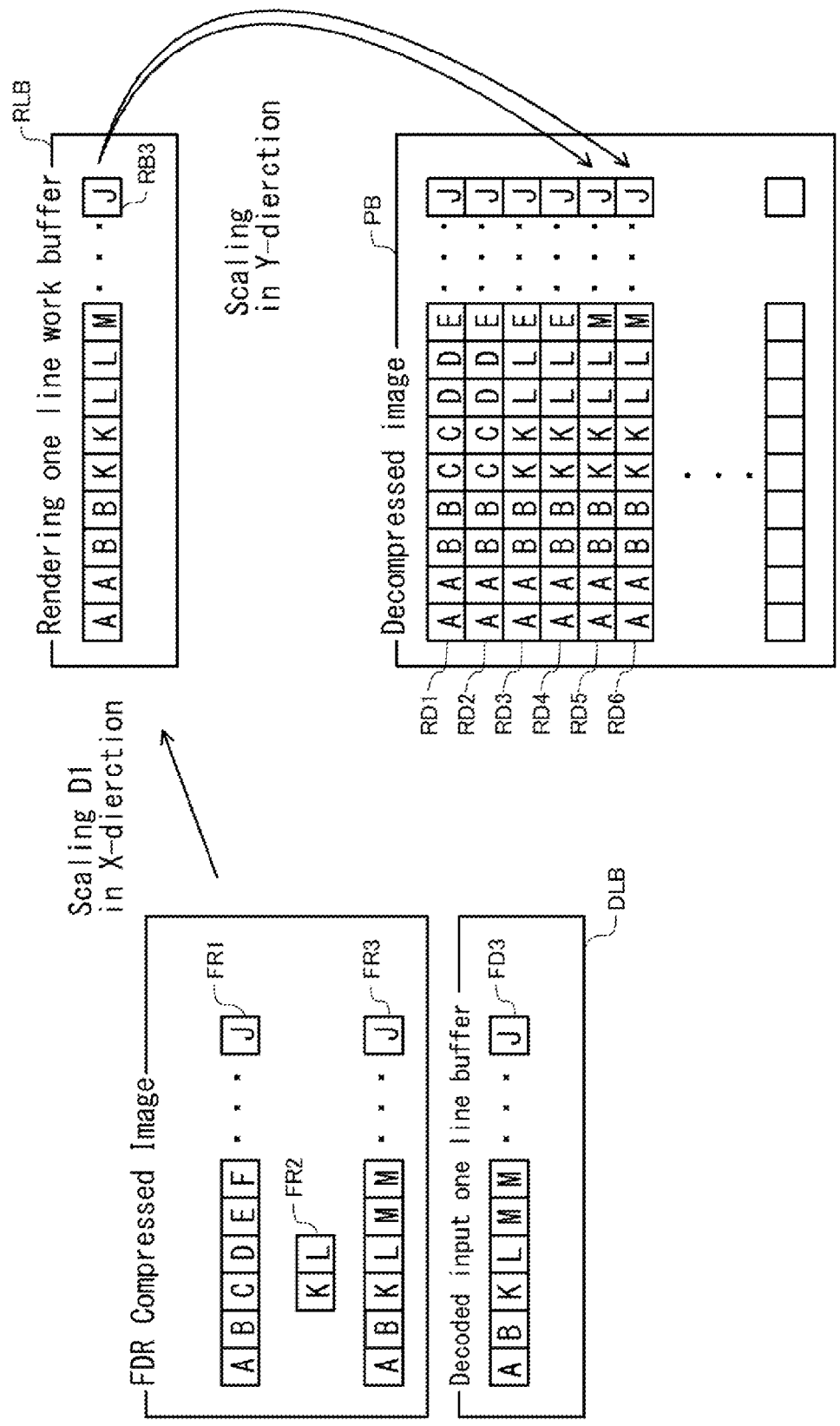
FIG. 18 illustrates a schematic drawing representing the image rendering process according to the one embodiment.

FIG. 18 illustrates a schematic drawing representing an image rendering process according to the one embodiment. At Step S757, since there is another line of the third FDR encoded row data FR3. Thus, the delta row decoding unit 121 returns the process to Step S753.

At Step S753, since there is a delta left the second decoded input line data FD2, the delta row decoding unit 121 advances the process to Step S754.

The third FDR encoded row data FR3 has an offset number of zero. The third decoded input line buffer FD3 is generated by simply copying the third FDR encoded row data FR3. The rest of the process is similar to the process for the first decoded input line buffer FD1. Thus, the image rendering unit 122 generates the rendered rows data RD5 and RD6 in the page buffer PB.

As described above, the image forming device 100 according to the one embodiment efficiently processes the delta row compressed image data by introducing another intermediate code. This new intermediate code is technically partially decoding or pre-decoding from the delta row compressed image data. This partial decoding process decodes the inefficiently encoded row data, which ends up with low compression ratio and consumes processing power for decoding. Thus, the image forming device 100 according to the one embodiment ensures the efficient use of its hardware resource.

Modifications

The disclosure will not be limited to respective embodiments described above, but modifications as follows are also possible.

Modification 1

While in the above-described embodiment the ratio for processing as delta limit is set to 0.25, the ratio may have any other value considering hardware resource including the memory area size and processing power of CPUs.

Modification 2

While in the above-described embodiment and the modification the ratio for processing as delta limit is preliminary set, the ratio may be automatically or semi-automatically changed based the hardware resource including the size of memory area and processing power of CPUs available for the image processing.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method, comprising:
   receiving, at a computing device, image data encoded by delta row encoding, the image data indicating two dimensionally arranged plurality of pixels, the image data including delta data indicating difference between N-th row line and (N−1)th row line in the two dimensionally arranged plurality of pixels;
   pre-decoding the image data for the N-th row line using the delta data if the delta data has a size equal to or larger than a threshold while keeping the image data for the N-th row line using the delta data if the delta data has a size smaller than the threshold, and generating intermediate codes, the steps being performed by the computing device; and
   decoding and rendering the kept undecoded lines in the generated intermediate codes while rendering the decoded lines in the generated intermediate codes, the steps being performed by the computing device.

2. The method of claim 1, wherein the rendering includes color conversion for the decoded lines.

3. The method of claim 1, wherein the rendering includes scaling for the decoded lines.

4. The method of claim 1, wherein the threshold is 0.25 as a ratio of a data size of the delta data to a data size of the line data.

5. The method of claim 1, further comprising determining, by the computing device, the threshold based on the hardware resource of the computing device.

6. The method of claim 5, wherein the hardware resource includes at least one of a memory size or a processing power of the computing device available for the image processing in the method of claim 1.

7. A computing device, comprising:
one or more processors; and
a non-transitory data storage storing computer-readable instructions that, when executed by the one or more processors, cause the computing device to perform functions comprising:
receiving image data encoded by delta row encoding, the image data indicating two dimensionally arranged plurality of pixels, the image data including delta data indicating difference between N-th row line and (N−1)th row line in the two dimensionally arranged plurality of pixels,
pre-decoding the image data for the N-th row line using the delta data if the delta data has a size equal to or larger than a threshold while keeping the image data for the N-th row line using the delta data if the delta data has a size smaller than the threshold, and generating intermediate codes, and
decoding and rendering the kept undecoded lines in the generated intermediate codes while rendering the decoded lines in the generated intermediate codes.

8. The computing device of claim 7, wherein the rendering includes color conversion for the decoded lines.

9. The computing device of claim 7, wherein the rendering includes scaling for the decoded lines.

10. The computing device of claim 7, wherein the threshold is 0.25 as a ratio of a data size of the delta data to a data size of the line data.

11. The computing device of claim 7, wherein the computing device determines the threshold based on the hardware resource of the computing device.

12. The computing device of claim 11, wherein the hardware resource includes at least one of a memory size or a processing power of the computing device available for the image processing in the computing device.

13. A non-transitory computer-readable recording medium storing computer-readable instructions that, when executed by the one or more processors, cause a computing device to execute:
receiving image data encoded by delta row encoding, the image data indicating two dimensionally arranged plurality of pixels, the image data including delta data indicating difference between N-th row line and (N−1)th row line in the two dimensionally arranged plurality of pixels;
pre-decoding the image data for the N-th row line using the delta data if the delta data has a size equal to or larger than a threshold while keeping the image data for the N-th row line using the delta data if the delta data has a size smaller than the threshold, and generating intermediate codes; and
decoding and rendering the kept undecoded lines in the generated intermediate codes while rendering the decoded lines in the generated intermediate codes.

14. The recording medium of claim 13, wherein the rendering includes color conversion for the decoded lines.

15. The recording medium of claim 13, wherein the rendering includes scaling for the decoded lines.

16. The recording medium of claim 13, wherein the threshold is 0.25 as a ratio of a data size of the delta data to a data size of the line data.

17. The recording medium of claim 13, further comprising determining, by the computing device, the threshold based on the hardware resource of the computing device.

18. The recording medium of claim 17, wherein the hardware resource includes at least one of a memory size or a processing power of the computing device available for the image processing in the computing device.

* * * * *